US007461681B2

(12) United States Patent
Marastoni

(10) Patent No.: US 7,461,681 B2
(45) Date of Patent: Dec. 9, 2008

(54) ROLLER FOR THE TRANSFERRING LABELS

(75) Inventor: Daniele Marastoni, Correggio (IT)

(73) Assignee: Sidel Holdings & Technology SA, Geneva (CH)

( * ) Notice: Subject to any disclaimer, the term of this patent is extended or adjusted under 35 U.S.C. 154(b) by 297 days.

(21) Appl. No.: 10/563,671

(22) PCT Filed: May 27, 2004

(86) PCT No.: PCT/IT2004/000312

§ 371 (c)(1),
(2), (4) Date: Jan. 6, 2006

(87) PCT Pub. No.: WO2005/005261

PCT Pub. Date: Jan. 20, 2005

(65) Prior Publication Data

US 2006/0162866 A1 Jul. 27, 2006

(30) Foreign Application Priority Data

Jul. 11, 2003 (IT) .......................... PR2003A0053

(51) Int. Cl.
*B32B 37/00* (2006.01)

(52) U.S. Cl. ...................................... 156/538; 156/556

(58) Field of Classification Search ................ 156/538, 156/539, 540, 541, 542, 556
See application file for complete search history.

(56) References Cited

U.S. PATENT DOCUMENTS

2002/0043322 A1 4/2002 Shiraishi

FOREIGN PATENT DOCUMENTS

EP 0 281 064 A1 9/1988

*Primary Examiner*—James Sells
(74) *Attorney, Agent, or Firm*—Pearne & Gordon LLP

(57) ABSTRACT

A roller (1) for transferring labels of the suction type, comprising a lateral surface (21) having a plurality of openings (2) communicating with respective suction conduits (3) to maintain a label adhering to said lateral surface (21). Originally, at least one of the suction conduits (3) is provided with at least an additional opening (5) located in a position that cannot be obstructed by the label adhering to the lateral surface (21) of the roller (1), to maintain said conduit (3) in constant communication with the external environment. Said additional opening (5) is preferably positioned in an upper area (41) of the roller at a suction opening (3).

8 Claims, 4 Drawing Sheets

ROLLER FOR THE TRANSFERRING LABELS

CROSS-REFERENCE TO RELATED APPLICATION

This application is a National Stage entry of International Application Number PCT/IT2004/000312, filed May 27, 2004. The disclosure of the prior application is hereby incorporated herein in its entirety by reference.

TECHNICAL FIELD AND BACKGROUND ART

The present invention relates to a transfer roller for transferring labels of the suction type, as described in the preamble to claim 1.

Known rollers for transferring labels are generally used in reel labelling machines, i.e. machines in which a film of labels is unwound from a reel and routed towards a cutting device, which cuts it to form the labels to be glued onto a container.

The label thus formed always has substantially rectangular or square shape and has two vertical and parallel edges.

The transfer roller, rotating at a predetermined speed about a normally vertical axis, picks up the label and transfers on gluing means and subsequently onto the container to be labelled.

Specifically, the gluing means lay a first strip of glue along a rear face of a first vertical edge of the label and subsequently lay a second strip of glue on a second vertical edge, which will be superposed and glued onto the first edge.

In accordance with a known embodiment variant, existing gluing means are able to lay the glue in points, instead of along one or more strips.

The containers to be labelled are brought in contact with the roller for transferring the label by means of a linear or rotary conveyor, commonly called carrousel.

In accordance with a first prior art technique, the transfer roller is provided with a group of pincers so shaped as to hold the label adhering to the lateral surface of the roller.

Such a transfer roller has the important drawback of being extremely complex to build, since it requires a system of appropriately dimensioned cams to open and shut the pincers during the rotation of the roller.

Secondly, a labelling machine provided with such a roller is not suitable for bottling plants with high productivity, due to the reduced speeds of rotation of the roller.

According to a second prior art technique, within a roller lacking pincers, a plurality of cavities communicating with a lateral surface of the roller through a series of through holes is obtained. Subsequently, through said cavities, a suction of variable and controlled intensity is provided in such a way that the labels can adhere to the lateral surface of the roller during their transfer from the cutting device to the container.

In accordance with a possible known embodiment variant, the lateral surface of the roller is provided with a plurality of recesses to collect the residues of glue which tend to be deposited on the suction holes, in order not to compromise their operation. Said residues are caused by the contact between the label and the gluing means and their consistency is influenced by the speed of rotation of the roller.

Such a transfer roller, known as a suction transfer roller, can be used for labelling both containers made of plastic material, typically PET, and glass containers.

This type of transfer roller has some important drawbacks.

First of all, the intensity and duration of the suction are very complex to control and can negatively influence the cutting precision of the label, especially during the starting transient of the machine.

Secondly, the obstruction of the holes by the label, together with the impossibility to interrupt the suction during the transfer of the label itself from the cutting device to the transfer roller and from the transfer roller to the container, makes difficult the sliding of the label on the lateral surface of the roller. This can compromise the correct positioning of the label on the roller and consequently on the container (especially for labels made of materials with a high friction coefficient) and worsen the operation of the labelling machine, limiting in particular the performance in terms of speed of operation and hourly productivity.

An additional drawback is the difficulty of managing the operating transient which occurs between two consecutive label transferring operations, due to the time required for a predetermined air flow rate to take place within the cavities, after the holes have been freed from the obstruction of the label. In particular, the compressibility of air, together with the intermittence of the suction caused by the presence/absence of the label, generates within the cavity resonance phenomena which compromise the correct positioning and sliding of the label itself on the lateral surface of the transfer roller.

DISCLOSURE OF INVENTION

An object of the present invention is to overcome the aforesaid drawbacks, making available a label transfer roller which is able to assure a high precision in the cutting of the label, especially during the machine start-up transient.

Another object of the present invention is to propose a transfer roller that is able to facilitate the sliding of the label on the lateral surface of the roller to favour its correct positioning.

Yet another object of the present invention is to make available a transfer roller that has a reduce operating transient between two consecutive label transfer operations, especially at low speeds of rotation.

A further object is to achieve the above results within the context of a simple, rational and reliable constructive solution.

Said objects are fully achieved by the roller for transferring labels of the present invention, which is characterised by the content of the appended claims.

BRIEF DESCRIPTION OF DRAWINGS

These and other objects shall become more readily apparent from the following description of a preferred embodiment, illustrated purely by way of non limiting example in the accompanying drawing tables, in which.

BEST MODE FOR CARRYING OUT THE INVENTION

Figure 1:
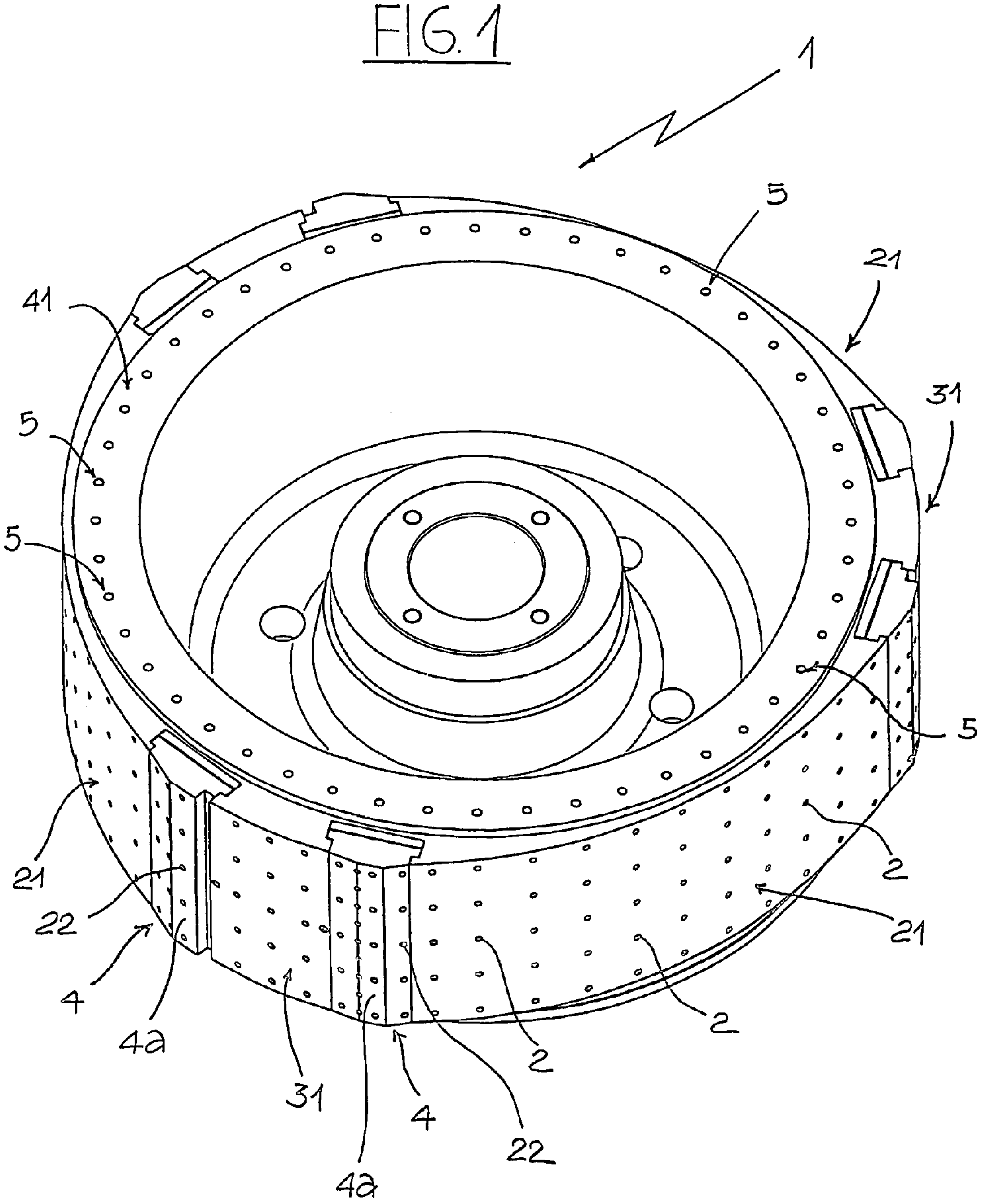
FIG. 1 is a perspective top view of a transfer roller.

With reference in particular to FIG. 1, the transfer roller according to the present invention is globally designated by the number 1 and is preferably made of aluminium alloy.

The transfer roller 1 is of the suction type and it has a lateral surface 21 provided with a plurality of openings 2 communicating with respective suction conduits 3, able to aspirate a predetermined flow rate of air to maintain a label adhering to said lateral surface 21.

In the preferred and illustrated embodiment, the openings 2 are preferably through holes having circular cross sections and distributed over the entire lateral surface 21 of the roller 1 according to vertical rows.

However, in an alternative embodiment, not shown herein, an area 31 positioned upstream of a shoe 4 relative to the direction of rotation of the roller 1 may lack suction openings (in the illustrated example, said area 31 is instead provided with openings).

In the illustrated example, the roller 1 is provided with three pairs of shoes 4 projecting relative to the lateral surface 21 of the roller 1 and also provided with a plurality of openings 22 communicating with respective suction conduits, in order to maintain the end portions of a label, or edges, adhering to an external surface 4*a* of the shoes 4.

At least one of the suction conduits 3 is provided with at least an additional opening 5 situated in a position that cannot be obstructed by a label which adheres to the lateral surface 21 of the roller 1. Said additional opening 5 allows to maintain the conduit 3 in constant communication with the external environment.

Figure 4:
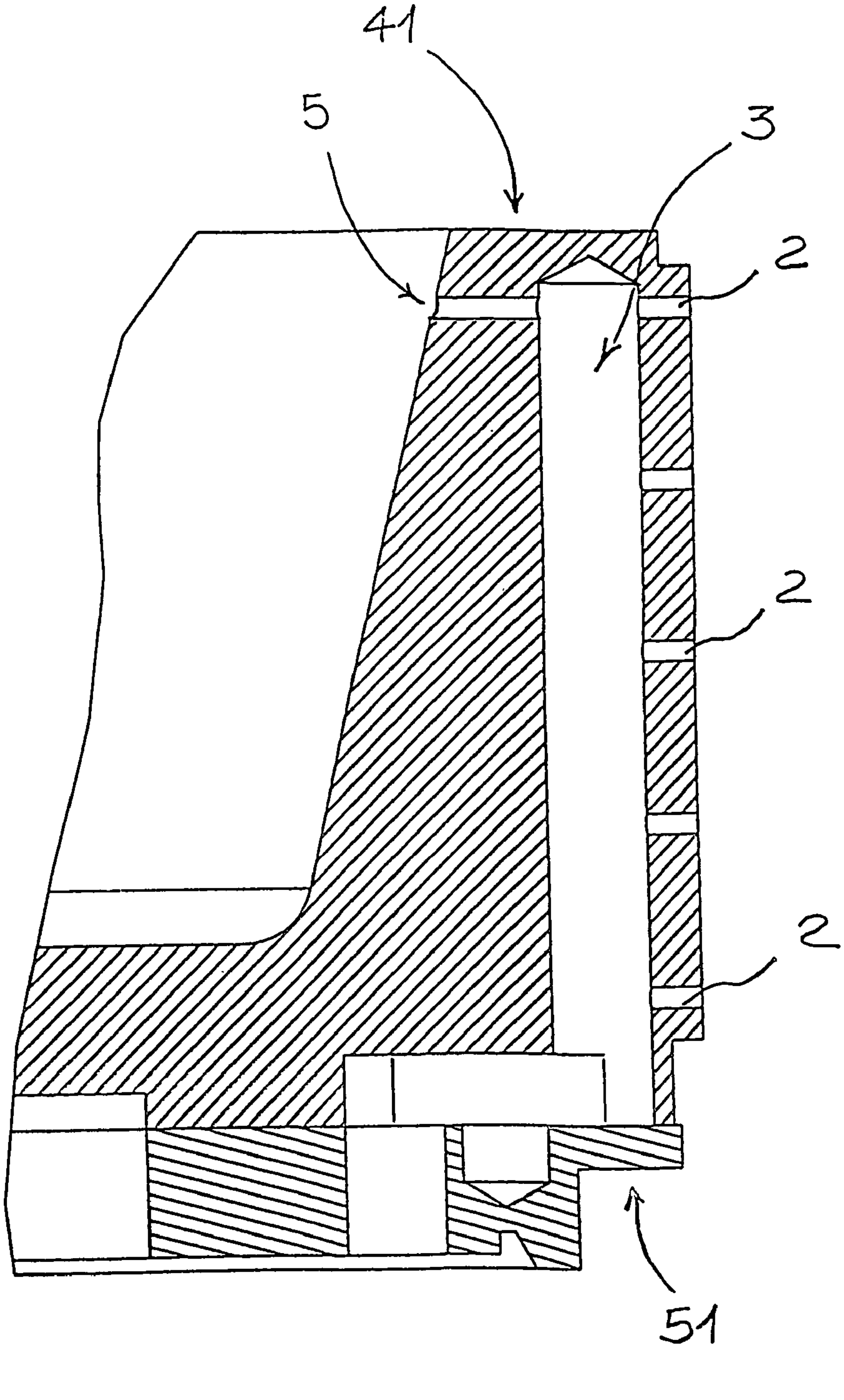
FIG. 4 is an enlarged section view of a constructive detail of an embodiment of a transfer roller according to the present invention.

With reference to FIG. 4, and in accordance with the invention, the additional opening 5 is positioned posteriorly to the lateral surface 21 of the roller 1 at a suction conduit 3.

In an alternative embodiment, said additional opening can be positioned in a lower area of the roller 1, also at the suction conduit 3.

In a further preferred and illustrated embodiment, each of the suction conduits is provided with an additional opening 5.

Figure 2:
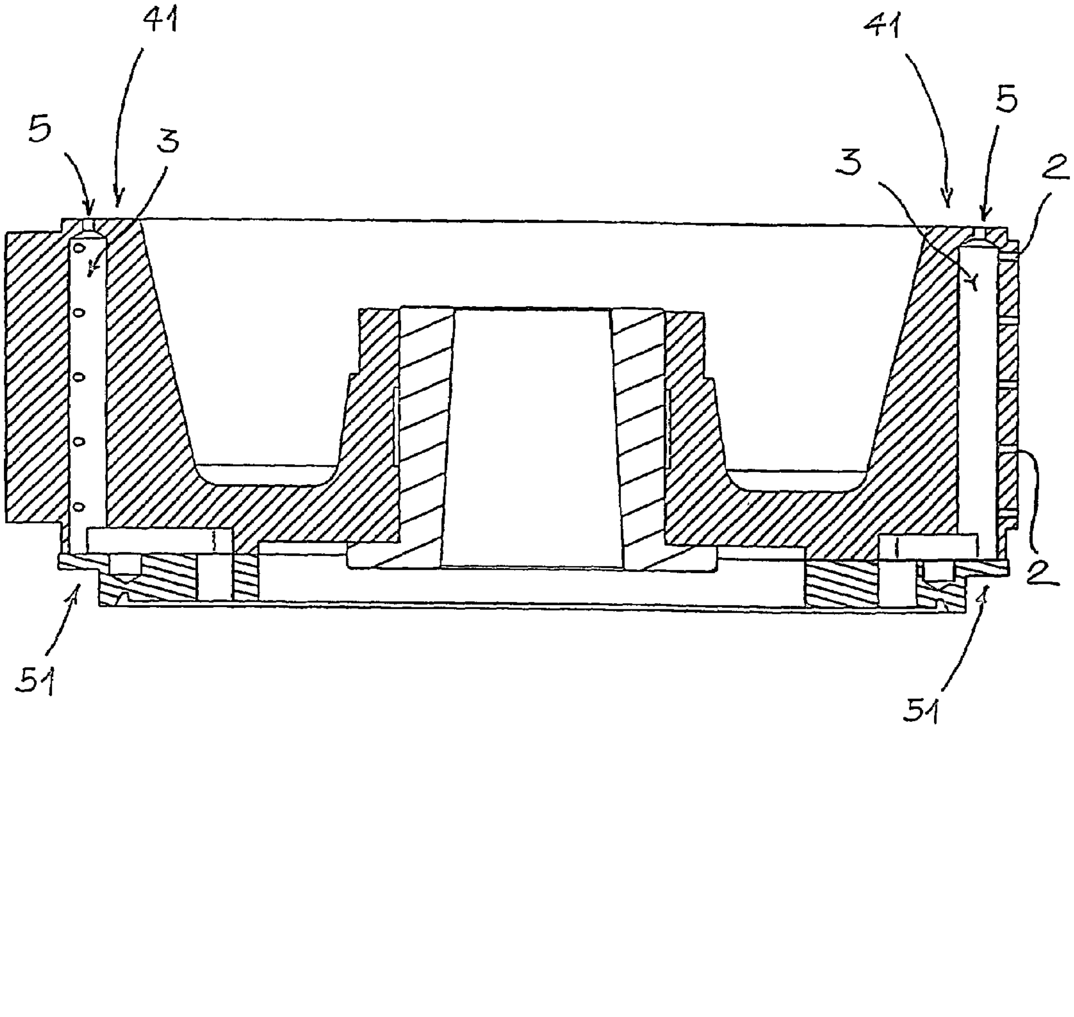
FIG. 2 is a frontal section view of the roller of FIG. 1.
Figure 3:
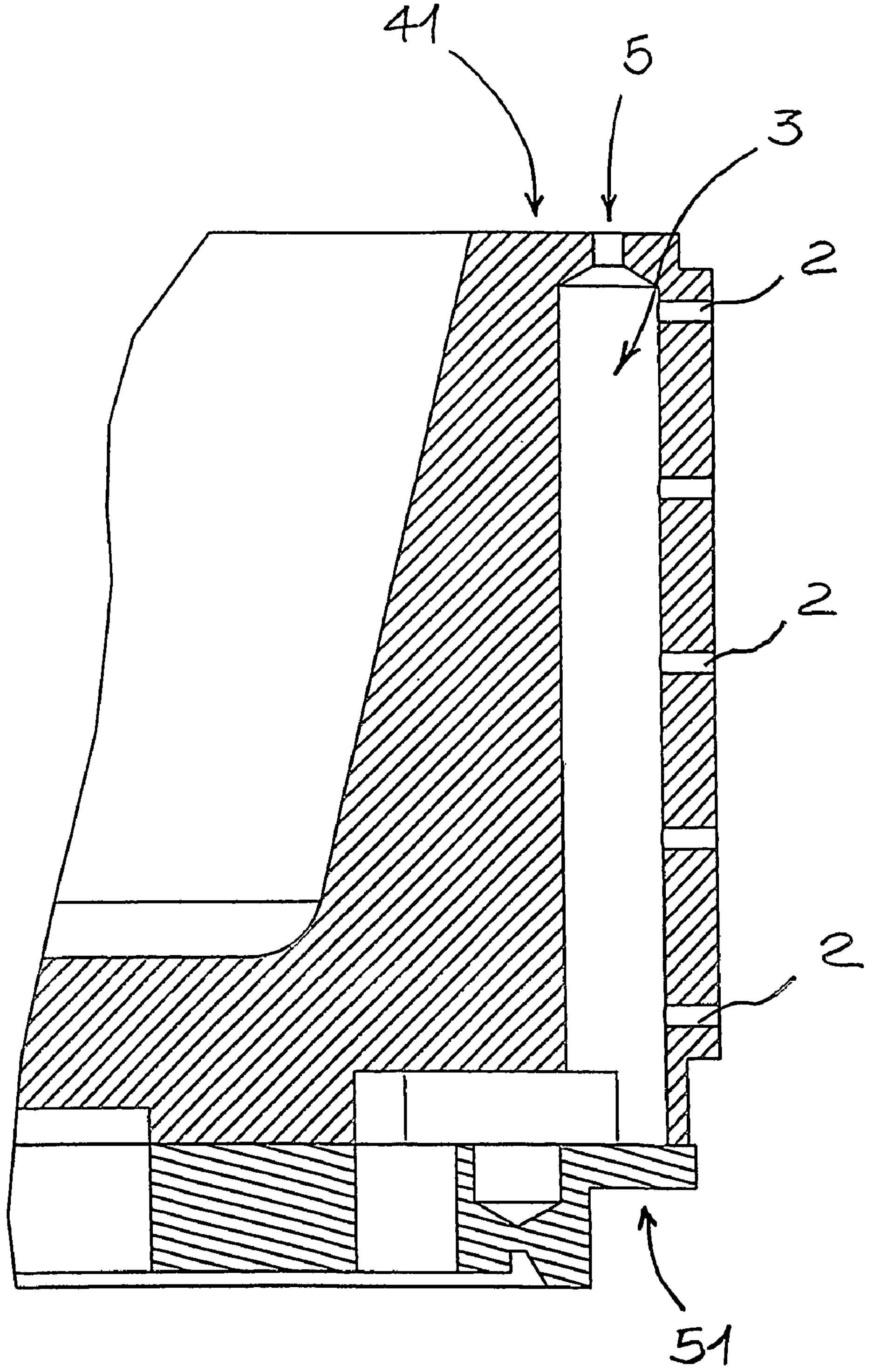
FIG. 3 is an enlarged view of a constructive detail of the transfer roller shown in FIG. 2.

With particular reference to FIGS. 2 and 3, each suction conduit 3 is substantially parallel to an axis of rotation of the roller 1.

In the preferred embodiment, the suction conduits 3 are inserted within an aspirating plant comprising an aspirating pump (not shown) able to impose a predetermined vacuum within the conduits 3 themselves. Moreover, the aspiration plant preferably comprises at least a maximum vacuum adjuster valve, i.e. a valve that is capable of maintaining the pressure within the conduits 3 above a predetermined minimum value during the step of transferring the label.

This valve prevents the label, adhering to the lateral surface 21 of the roller 1, from causing an excessive vacuum inside the suction conduits 3.

In accordance with a further preferred embodiment variant not shown herein, the additional opening 5 is provided with at least a filter to prevent the entrance of dirt into a suction conduit 3.

The operation of the invention is as follows.

The label, after being cut starting from a film of labels unwound from a reel, is set onto the lateral surface 21 of the transfer roller.

The transfer roller holds it by means of the suction operated by the conduits 3 communicating with the lateral surface 21 through the openings 2.

The suction of air, unlike prior art transfer rollers, takes place both through the openings 21, as stated above, and through an additional opening 5 present on each suction roller 3 and positioned in an upper area 41 of the roller 1.

In this way, when the label obstructs the openings 2, it is always possible to assure a minimum air flow rate within the suction conduits 3 and hence within the aspiration plant.

This minimum air flow rate is absolutely beneficial in that it eliminates, or at least reduces, the operating transients between two consecutive transfers of labels, since it prevents any resonance phenomena due to the intermittent suction (caused by the continual presence/absence of the label in front of the openings 2) and to the compressibility of air.

Moreover, when the suction is interrupted at predetermined angular positions, fixed with respect to the rotation of the roller (in manners that are known and hence not described herein), the presence of the additional openings 5 assures the presence of atmospheric pressure within the suction conduits, thereby facilitating the transfer of the label on the container and/or readying the roller for a subsequent transfer.

The invention achieves important advantages.

First of all, such a transfer roller assures a high cutting precision of the label, especially during the machine start-up transient of the machine and/or during the operating transient between two consecutive transfers of labels, in particular at low speeds of rotation of the roller.

Secondly, the presence of an additional opening 5, assuring a minimum and constant air flow rate within the suction conduit 3 or anyway assuring the presence of the atmospheric pressure, facilitates the sliding of the label on the lateral surface 21 of the roller 1 and favours its correct positioning.

Advantageously, such a transfer roller is simple and economical to build.

The invention claimed is:

1. A transfer roller (1) for transferring labels of the suction type, comprising a lateral surface (21) having a plurality of openings (2) communicating with respective suction conduits (3) to maintain a label adhering to said lateral surface (21), at least one of the suction conduits (3) being provided with at least an additional opening (5) located in a position that cannot be obstructed by the label adhering to the lateral surface (21) of the roller (1), to maintain said conduit (3) in constant communication with the external environment, wherein said additional opening (5) is positioned posteriorly to the lateral surface (21) of the roller (1) at a suction conduit (3).

2. Transfer roller as claimed in claim 1, wherein said additional opening (5) is provided with at least a filter to prevent the entrance of dirt into a suction conduit (3).

3. Transfer roller as claimed in claim 1, wherein each suction conduit (3) is substantially parallel to an axis of rotation of the roller (1).

4. Transfer roller as claimed in claim 1, wherein it comprises at least a pair of shoes (4) projecting relative to the lateral surface (21) of the roller (1) and provided with a plurality of openings (22) communicating with respective suction conduits to maintain end portions of a label adhering to an external surface (4*a*) of the shoes (4).

5. Transfer roller as claimed in claim 1, wherein the suction conduits (3) are inserted within an aspirating plant comprising an aspirating pump to impose a predetermined vacuum within the conduits (3) themselves.

6. Transfer roller as claimed in claim 5, wherein the aspiration plant comprises at least a maximum value adjuster valve.

7. Transfer roller (1) as claimed in claim 1 wherein each suction conduit (3) is provided with at least such an additional opening (5).

8. A labelling machine, comprising a transfer roller (1) as claimed in claims 1, 2, 3, 4, 5, 6 or 7.

* * * * *